(12) United States Patent
Wilhelm et al.

(10) Patent No.: US 11,325,176 B2
(45) Date of Patent: May 10, 2022

(54) MULTIPLE STROKE SLOTTING OF PLANAR WORKPIECES

(71) Applicant: TRUMPF Werkzeugmaschinen GmbH + Co. KG, Ditzingen (DE)

(72) Inventors: Markus Wilhelm, Gerlingen (DE); Rainer Hank, Eberdingen/Hochdorf (DE); Marc Klinkhammer, Ditzingen (DE); Leonard Schindewolf, Rutesheim (DE); Simon Ockenfuss, Boeblingen (DE); Jens Kappes, Leinfelden-Echterdingen (DE); Dennis Traenklein, Nufringen (DE); Alexander Tatarczyk, Hoeffingen (DE); Joerg Neupert, Stuttgart (DE); Dominik Bitto, Muenchingen (DE); Markus Maatz, Leinfelden-Echterdingen (DE); Christian Jakisch, Boeblingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 16/363,166

(22) Filed: Mar. 25, 2019

(65) Prior Publication Data

US 2019/0217369 A1 Jul. 18, 2019

Related U.S. Application Data

(63) Continuation of application No. PCT/EP2017/074330, filed on Sep. 26, 2017.

(30) Foreign Application Priority Data

Sep. 26, 2016 (DE) .......................... 102016118175.7
Oct. 21, 2016 (DE) .......................... 102016120139.1

(51) Int. Cl.
 *B21D 28/34* (2006.01)
 *B21D 28/14* (2006.01)
 (Continued)

(52) U.S. Cl.
 CPC ............. *B21D 28/34* (2013.01); *B21D 28/14* (2013.01); *B23D 27/00* (2013.01); *B26F 1/14* (2013.01)

(58) Field of Classification Search
 CPC ........ B23D 27/00; B23D 31/04; B23D 15/04; B23D 15/06; Y10S 83/916; Y10S 83/917;
 (Continued)

(56) References Cited

U.S. PATENT DOCUMENTS

| 4,771,663 A | * | 9/1988 | Naito | ..................... B21D 28/12 83/237 |
| 4,981,058 A | * | 1/1991 | Gavrun, III | ............ B21D 28/12 83/34 |

(Continued)

FOREIGN PATENT DOCUMENTS

| DE | 200 20 499 | 3/2001 |
| EP | 1 317 974 | 7/2003 |

(Continued)

OTHER PUBLICATIONS

International Preliminary Report on Patentability in International Application No. PCT/EP2017/074330, dated Mar. 26, 2019, 9 pages (English translation).

(Continued)

*Primary Examiner* — Evan H Macfarlane
(74) *Attorney, Agent, or Firm* — Fish & Richardson P.C.

(57) ABSTRACT

A method for multiple-stroke slotting of planar workpieces includes positioning a workpiece relative to a slotting tool having a punch and a die, moving the punch and the die relative to one another, moving the slotting tool and the (Continued)

workpiece relative to one another, slotting a workpiece by a slot length during a sectioning slot stroke and at least one subsequent slotting stroke in a sectioning phase, and performing strokes in form of slotting strokes and at least one trimming stroke during the relative movement of the punch and the die in a working phase. The subsequent slotting stroke is performed prior to the trimming stroke, and the slot length exceeds a maximum attainable slot length during the trimming stroke. The workpiece and the slotting tool are moved relative to one another by at least one feed movement between the strokes.

10 Claims, 11 Drawing Sheets

(51) Int. Cl.
  *B26F 1/14* (2006.01)
  *B23D 27/00* (2006.01)
(58) Field of Classification Search
  CPC ............ Y10T 83/0572; Y10T 83/0605; Y10T 83/9432; Y10T 83/9435; Y10T 83/8854; Y10T 83/87; Y10T 83/9423; Y10T 83/9425; Y10T 83/943; Y10T 83/9442; Y10T 83/8873; Y10T 83/8874; Y10T 83/8742; Y10T 83/9418; Y10T 83/05; B21D 28/002; B21D 28/02; B21D 28/10; B21D 28/12; B21D 28/14; B21D 28/16; B21D 28/24; B21D 28/26; B21D 28/265; B21D 28/325; B21D 28/34; B26F 1/02; B26F 1/14; B26F 1/3806; B26F 1/3813; B26F 1/405
  USPC ......... 83/916, 917, 682, 684, 685, 687, 692, 83/693, 49, 56, 636, 689
  See application file for complete search history.

(56) References Cited

U.S. PATENT DOCUMENTS

| | | | | |
|---|---|---|---|---|
| 5,400,682 A * | 3/1995 | Matsuura | ............... | B21D 28/12 83/49 |
| 5,499,566 A * | 3/1996 | Endo | ............... | B21D 28/34 83/49 |
| 5,988,032 A * | 11/1999 | Seki | ............... | B21D 28/34 83/583 |
| 9,839,952 B2 * | 12/2017 | Kraft | ............... | B21D 28/14 |
| 2003/0106404 A1 * | 6/2003 | Graf | ............... | B23D 27/00 83/49 |
| 2006/0027626 A1 * | 2/2006 | Endo | ............... | B21D 5/01 228/101 |
| 2013/0000456 A1 * | 1/2013 | Matsumura | ............... | B21D 28/16 83/49 |
| 2013/0055864 A1 * | 3/2013 | Brahmer | ............... | B23D 27/00 83/13 |
| 2013/0276603 A1 * | 10/2013 | Matsumura | ............... | B21D 28/10 83/39 |
| 2015/0290826 A1 * | 10/2015 | Saito | ............... | B23D 27/00 83/72 |
| 2015/0314380 A1 * | 11/2015 | Saito | ............... | B23D 27/00 83/559 |

FOREIGN PATENT DOCUMENTS

| | | |
|---|---|---|
| EP | 3 106 241 | 12/2016 |
| JP | H06 297053 | 10/1994 |

OTHER PUBLICATIONS

International Search Report and Written Opinion in International Application No. PCT/EP2017/074330, dated Jan. 31, 2018, 20 pages (with English translation).

* cited by examiner

MULTIPLE STROKE SLOTTING OF PLANAR WORKPIECES

CROSS REFERENCE TO RELATED APPLICATIONS

This application is a continuation of and claims priority under 35 U.S.C. § 120 from PCT Application No. PCT/EP2017/074330 filed on Sep. 26, 2017, which claims priority from German Application No. 10 2016 118 175.7, filed on Sep. 26, 2016, and German Application No. 10 2016 120 139.1, filed on Oct. 21, 2016. The entire contents of each of these priority applications are incorporated herein by reference.

TECHNICAL FIELD

The invention relates to a method, and to a machine tool and a slotting tool, for the multiple-stroke slotting of planar workpieces, in particular metal sheets.

BACKGROUND

In order to create high-quality cutting surfaces, a method of the type in question according to DE 200 20 499 U1 is currently used. According to this method, slots are made by means of a slotting tool, comprising a punch and a die between which the workpiece to be machined is positioned. The punch and the die each comprise two longitudinal cutting edges that run in the slot direction, and transverse cutting edges running transversely to the slot direction, at the longitudinal ends of the longitudinal cutting edges and between said edges, wherein the longitudinal cutting edges rise up on the punch in the slot direction, relative to the die, and a front transverse cutting edge of the punch is higher than a rear transverse cutting edge. During the method, the punch and the die are moved towards one another, relative to one another, and the slotting tool and the workpiece are moved relative to one another in the feed direction. During the relative movement thereof, the punch and the die perform strokes in the form of slotting strokes and at least one trimming stroke.

The die comprises an aperture, the length of which is defined by front transverse cutting edge and a trimming edge that is located within the die and is recessed relative to the workpiece rest surface. A first embodiment of the slotting tool comprises a two-part punch, in which first longitudinal cutting edges can be inserted into the aperture of the die in order to cut free the material strip, and second longitudinal cutting edges of the punch can come to rest on the trimming edge of the die. As a result, the material strip can be cut free and the material strip can be separating by means of a stroke movement of the punch relative to the die.

In a second embodiment of the slotting tool, the punch is formed integrally, having a continuous longitudinal cutting edge. The punch is moved towards the die, by means of a stroke movement, in order to cut free the material strip, and the material strip is separated at the trimming edge. At this time, it is necessary to stop the stroke movement in order to prevent the longitudinal cutting edge of the punch and the trimming edge of the die from coming into contact with one another.

In both embodiments, the punch is subsequently raised from the die, in the opposite direction from the stroke movement. In an end phase, the punch is rotated by 180°, after the material strip has been cut free, in order to cut the material strip free of the solid material by means of a final trimming stroke.

A method for producing slots in planar workpieces using a slotting tool comprising a punch and a die is furthermore known from EP 1 317 974 B1. The punch and the die each comprise two longitudinal cutting edges that run in the slot direction, and transverse cutting edges running transversely to the slot direction, at the longitudinal ends of the longitudinal cutting edges and between said edges. In a manner deviating from the die of DE 200 20 499 U1, said die does not comprise a internal trimming edge.

In order to produce a slot in the planar workpiece, a sectioning slotting stroke is performed in a sectioning phase, during which stroke a section is produced at a distance from the workpiece edge. In the process, a material strip is cut free, one end of which strip remains connected to the planar workpiece. The punch and the die are moved away from one another. Subsequently, a movement of the planar material in the feed direction is performed by means of coordinate guidance of the machine tool, such that the cut-free material strip is lengthened in a subsequent slotting stroke. The punch and the die are subsequently moved away from one another again. The coordinate guidance initiates a return stroke that is directed opposite to the feed stroke. The return stroke is ended if the front free end of the material strip is located within a slot opening of the die. A pendulum stroke is thus performed. A trimming stroke is subsequently performed, in order to completely separate the cut-free material strip.

A working phase takes place following said sectioning phase. In said working phase, the coordinate guidance again first moves the planar workpiece in the feed direction by a feed stroke length that corresponds to the maximum achievable cutting length. A slotting stroke is subsequently performed, in order to again cut free a material strip. The punch and the die are subsequently moved away from one another again, within the working phase. The coordinate means in turn performs a return stroke. Subsequently, in order to separate the cut-free material strip, a trimming stroke is initiated by means of the punch and the die being moved towards one another. Said working phase, comprising the slotting stroke and the subsequent trimming stroke, wherein a thrust movement of the planar workpiece is controlled by the coordinate means, between the slotting stroke and the trimming stroke, can be repeated multiple times, depending on the length of the slot that is to be made.

In an end phase, after the material strip has been cut free the planar material is moved in the feed direction, by the coordinate means, in order to subsequently cut a material strip free of the solid material, i.e. on the far side of the connection to the remaining workpiece, by means of a final trimming stroke.

SUMMARY

One of the objects of the invention is that of proposing a method and a machine, as well as a slotting tool, for producing slots planar workpieces, by means of which the quality of the cutting surfaces, in particular when producing visible edges and when edging workpieces, is further increased and the machining duration for making slots is reduced.

One aspect of the invention features a method for the multiple-stroke slotting of planar workpieces, in which a slotting stroke for cutting free the material strip and a trimming stroke for separating the material strip, in which the punch and/or the die are controlled in a superposed manner, by means of a stroke movement along a stroke axis and a further traversing movement along a movement axis that is different from the stroke movement, are performed in a working phase of the slotting tool. This allows for both shearing of a material strip and subsequent cutting free of the material strip during said working phase. As a result, the working time, and thus the process cycle, can be made shorter. Said superposed traversing movement of the punch and/or of the die within a working process can also improve the quality of the cutting face, since continuous control of a working phase is made possible, resulting in an improved cutting guide.

According to an advantageous embodiment of the method, the position of the workpiece relative to the punch or the position of the workpiece relative to the die is maintained during the working phase. A further increase in the cutting quality can be attained thereby.

It is preferable for the slotting tool to be controlled by means of a return stroke-free working stroke during the working phase, during which stroke the material strip is cut free by means of a slotting stroke, and the material strip is separated from the workpiece by means of a preferably subsequent trimming stroke. This working phase makes it possible for the material strip to first be cut free by means of a stroke movement, and for a subsequent trimming stroke for the cutting of the material to be performed by means of a superposed traversing movement along the stroke axis and the upper positioning axis. The trimming stroke is performed by a traversing movement along the stroke axis. Further optimization of the machining time can be made possible by preventing a pendulum stroke or a return stroke.

The working stroke in a working phase is preferably divided into a plurality of stroke phases, wherein a single-axis stroke movement being controlled for the slotting stroke in a first stroke phase, in which stroke movement the punch and/or the die are moved towards one another. After the material strip has been cut free by means of the single-axis stroke movement, a second stroke phase is preferably initiated, in which the single-axis stroke movement of the punch or of the die is superposed by a second movement direction along the positioning axis, such that an inclined or obliquely running stroke movement is controlled. As a result, a positioning axis of the punch and a positioning axis of the die are moved in parallel with one another. Therefore, preferably the slotting stroke is first performed, and subsequently the trimming stroke is performed, in the same working phase.

A first stroke phase of the working stroke is preferably ended as soon as a front transverse cutting edge of the punch is transferred to a height of a front transverse cutting edge of the die. As a result, selective cutting free of the material strip can be attained, such that an opposite end of said strip still remains on the workpiece. It is alternatively possible for the first stroke phase of the working stroke to be ended as soon as a front transverse cutting edge of the punch is positioned relative to the die so as to be at a distance from the material thickness of the workpiece.

It is furthermore preferable for the second stroke phase of the working stroke to be ended, in the working phase, as soon as the front transverse cutting edge of the punch is positioned opposite an inner trimming edge, in the die, that is located deeper than the front transverse cutting edge of the die.

A third stroke phase that follows the second stroke phase of the working stroke is preferably again controlled by a single-axis stroke movement of the punch and/or of the die, such that the cut-free material strip can be separated from the workpiece, at the trimming edge, in a simple manner.

A sectioning phase that precedes the working stroke preferably comprises a first working stroke, in which a material strip is cut free, wherein the stroke movement of the punch relative to the die is restricted, such that only part of the longitudinal cutting edge of the punch enters the opening of the die. Virtual shearing can take place as a result, and the material strip can be transferred into the opening of the die, by means of bending, at least in part.

The stroke phases of the working stroke in the working phase preferably follow the first working stroke of the initial slotting phase. Only a short first working cycle is necessary in order to make a first slot, wherein the following working cycle for the working phase can be repeated multiple times, depending on the length of the slot.

After the working phase has been performed, an end phase is preferably controlled, in which the slotting tool is rotated by 180° about the position axis, while maintaining the position of the workpiece, and an end stroke is subsequently performed, during which stroke a part of the material strip is cut free from the solid material of the workpiece. As a result, a clean final separating cut can be performed, such that possible countersinking of the material strip relative to the workpiece plane does not occur.

Another aspect of the invention features a machine tool for multiple-stroke slotting of planar workpieces, in which the punch and/or the die are arranged and moveable towards one another at least on a stroke drive device, and the at least one stroke drive device is moveable on an upper and/or lower positioning axis that is held by the machine frame, which positioning axis is perpendicular to the stroke axis of the punch and of the die, and each positioning axis can be controlled independently of the others, by the controller, such that the punch and/or the die can be controlled at least for a working stroke in a working phase. The independent control in the traversing movement of the punch and/or of the die along the upper and lower positioning axis allows for a stroke movement of the punch and/or of the die that is inclined relative to the stroke axis to be controllable. A stroke movement of this kind that is located outside the stroke axis can be controlled in a manner depending on the length of the cutting of the punch and/or of the die in the slot direction. The control of the stroke movement outside a stroke axis, in particular vertical stroke axis, can allow for return stroke-free machining for introducing slots.

In order to position the planar workpiece in der machine tool, it is preferable for the slotting tool to be movable by means of an upper and/or lower drive assembly, between the initial slotting phase, the working phase and the end phase, and between two working strokes in the working phase. The slotting tool can be moved independently along the upper and lower positioning axis by means of said drive assembly, wherein the drive assembly comprises a motor drive for controlling the relevant traversing movement.

A further aspect of the invention features a slotting tool, in particular for performing the method described above, which tool comprises a punch and a die, wherein the punch is formed having two longitudinal cutting edges that run in the slot direction, and having transverse cutting edges running transversely to the slot direction, at the longitudinal ends of the transverse cutting edges and between said ends. The longitudinal cutting edges on the punch rise up, relative to the rear transverse cutting edge, in the direction of the front transverse cutting edge. The die comprises two longitudinal cutting edges that run in the slot direction, and a front and rear transverse cutting edge running transversely to the slot direction, at the longitudinal ends of the longitudinal cutting edges and between said edges. An opening in a bearing surface of the die is longer than the longitudinal cutting edge of the punch, and an inner trimming edge is provided adjacently to said opening, which trimming edge is recessed relative to the front transverse cutting edge of the die and is set back in the direction of the rear transverse cutting edge of the die. The rear transverse cutting edge and the trimming edge define the length of the opening in the die. The length of the longitudinal cutting edges of the punch correspond to the length of the aperture in the die. In particular, the length of the longitudinal cutting edges of the punch and a width for a cutting gap between the punch and the die corresponds to the length of the aperture. A slotting tool of this kind allows for both shearing or cutting free of the material strip, as well as a following trimming stroke, to be made possible in a working stroke. As a result, a working stroke can be performed in the working phase by means of a movement of the punch and of the die relative to one another, without a return stroke being required. The cycle times can in turn be reduced thereby.

It is preferable for the slotting tool to comprise an integral punch. In this slotting tool, the longitudinal cutting edges are continuous on the punch. This simplifies the production.

DESCRIPTION OF DRAWINGS

The invention and further advantageous embodiments and developments thereof will be described and explained in greater detail in the following, with reference to the examples shown in the drawings. The features found in the description and the drawings can be applied, according to the invention, individually or together, in any desired combination. In the drawings.

DETAILED DESCRIPTION

Figure 1:
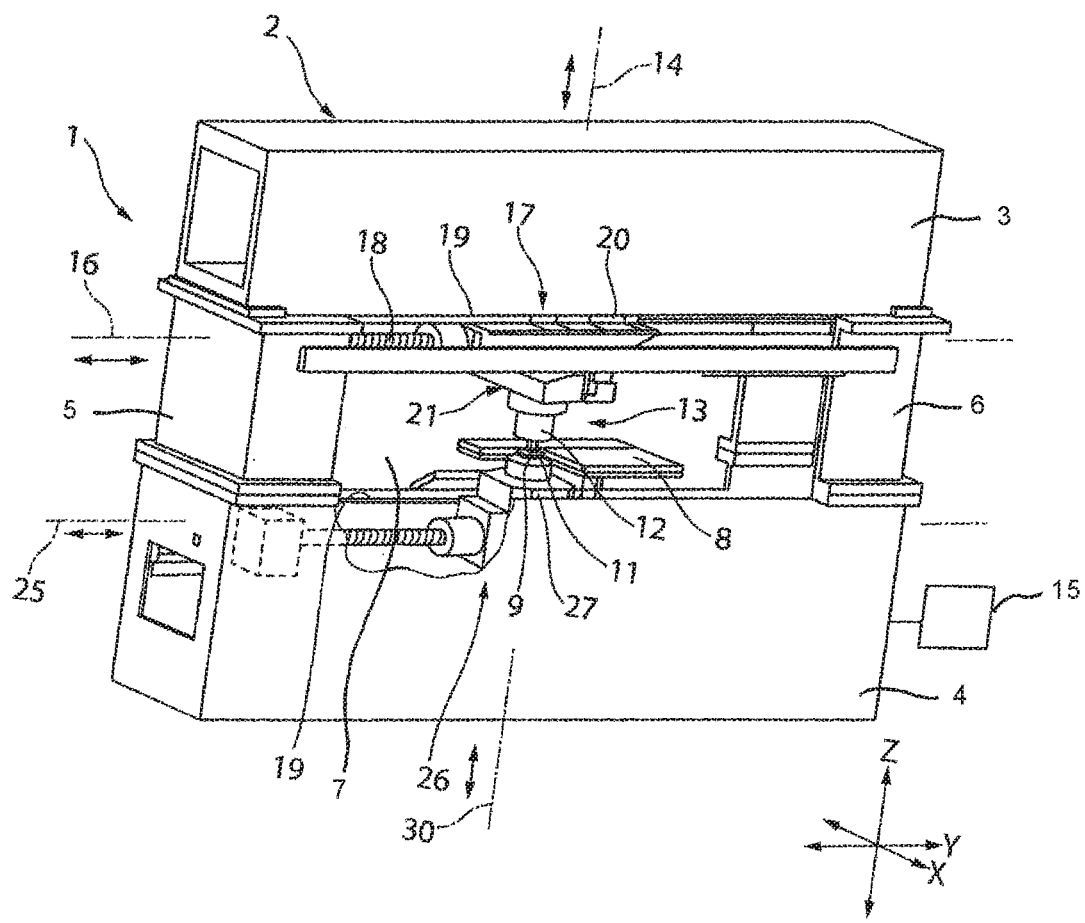
FIG. 1 is a perspective view of the machine tool.

FIG. 1 shows a machine tool 1 which is configured as a punch press. This machine tool 1 comprises a supporting structure with a closed machine frame 2. This comprises two horizontal frame limbs 3, 4 and two vertical frame limbs 5 and 6. The machine frame 2 surrounds a frame interior 7, which forms the working area of the machine tool 1 with an upper tool 11 and a lower tool 9.

The machine tool 1 is used to machine planar workpieces 10, which for the sake of simplicity have not been shown in FIG. 1 and can be arranged in the frame interior 7 for machining purposes. A workpiece 10 to be machined is placed on a workpiece support 8 provided in the frame interior 7. The lower tool 9, for example in the form of a die, is mounted in a recess in the workpiece support 8 on the lower horizontal frame limb 4 of the machine frame 2. This die can be provided with a die opening. In the case of a punching operation the upper tool 11 formed as a punch dips into the die opening of the lower tool formed as a die.

The upper tool 11 and lower tool 9, instead of being formed by a punch and a die for punching, can also be formed by a bending punch and a bending die for shaping workpieces 10.

The upper tool 11 is fixed in a tool receptacle on a lower end of a ram 12. The ram 12 is part of a stroke drive device 13, by means of which the upper tool 11 can be moved in a stroke direction along a stroke axis 14. The stroke axis 14 runs in the direction of the Z axis of the coordinate system of a numerical controller 15 of the machine tool 1 indicated in FIG. 1. The stroke drive device 13 can be moved perpendicular to the stroke axis 14 along a positioning axis 16 in the direction of the double-headed arrow. The positioning axis 16 runs in the direction of the Y axis of the coordinate system of the numerical controller 15. The stroke drive device 13 receiving the upper tool 11 is moved along the positioning axis 16 by means of a motor drive 17.

The movement of the ram 12 along the stroke axis 14 and the positioning of the stroke drive device 13 along the positioning axis 16 are achieved by means of a motor drive 17, which can be configured in the form of a drive assembly 17, in particular a spindle drive assembly, with a drive spindle 18 running in the direction of the positioning axis 16 and fixedly connected to the machine frame 2. The stroke drive device 13, in the event of movements along the positioning axis 16, is guided on three guide rails 19 of the upper frame limb 3, of which two guide rails 19 can be seen in FIG. 1. The other guide rail 19 runs parallel to the visible guide rail 19 and is distanced therefrom in the direction of the X axis of the coordinate system of the numerical controller 15. Guide shoes 20 of the stroke drive device 13 run on the guide rails 19. The mutual engagement of the guide rail 19 and the guide shoe 20 is such that this connection between the guide rails 19 and the guide shoes 20 can also bear a load acting in the vertical direction. The stroke device 13 is mounted on the machine frame 2 accordingly via the guide shoes 20 and the guide rails 19. A further component of the stroke drive device 13 is a wedge gear 21, by means of which the position of the upper tool 11 relative to the lower tool 9 is adjustable.

The lower tool 9 is received moveably along a lower positioning axis 25. This lower positioning axis 25 runs in the direction of the Y axis of the coordinate system of the numerical controller 15. The lower positioning axis 25 is preferably oriented parallel to the upper positioning axis 16. The lower tool 9 can be moved directly on the lower positioning axis 16 by means of a motor drive assembly 26 along the positioning axis 25. Alternatively or additionally the lower tool 9 can also be provided on a stroke drive device 27, which is moveable along the lower positioning axis 25 by means of the motor drive assembly 26. This drive assembly 26 is preferably configured as a spindle drive assembly. The lower stroke drive device 27 can correspond in respect of its structure to the upper stroke drive device 13. The motor drive assembly 26 likewise may correspond to the motor drive assembly 17.

The lower stroke drive device 27 is mounted displaceably on guide rails 19 associated with a lower horizontal frame limb 4. Guide shoes of the stroke drive device 27 run on the guide rails 19, such that the connection between the guide rails 19 and the guide shoes at the lower tool 9 can also bear a load acting in the vertical direction. Accordingly, the stroke drive device 27 is also mounted on the machine frame 2 via the guide shoes and the guide rails 19, moreover at a distance from the guide rails 19 and guide shoes 20 of the upper stroke drive device 13. The stroke drive device 27 may also comprise a wedge gear, by means of which the position or height of the lower tool 9 along the Z axis is adjustable.

By means of the numerical controller 15, both the motor drives 17 for a traversing movement of the upper tool 11 along the upper positioning axis 16 and the one or more motor drives 26 for a traversing movement of the lower tool 9 along the lower positioning axis 25 can be controlled independently of one another. The upper and lower tools 11, 9 are thus moveable synchronously in the direction of the Y axis of the coordinate system. An independent traversing movement of the upper and lower tools 11, 9 in different directions can also be controlled. This independent traversing movement of the upper and lower tools 11, 9 can be controlled simultaneously. As a result of the decoupling of the traversing movement between the upper tool 11 and the lower tool 9, an increased versatility of the machining of workpieces 10 can be attained. The upper and lower tools 11, 9 can also be configured to machine the workpieces 10 in many ways.

Figure 2:
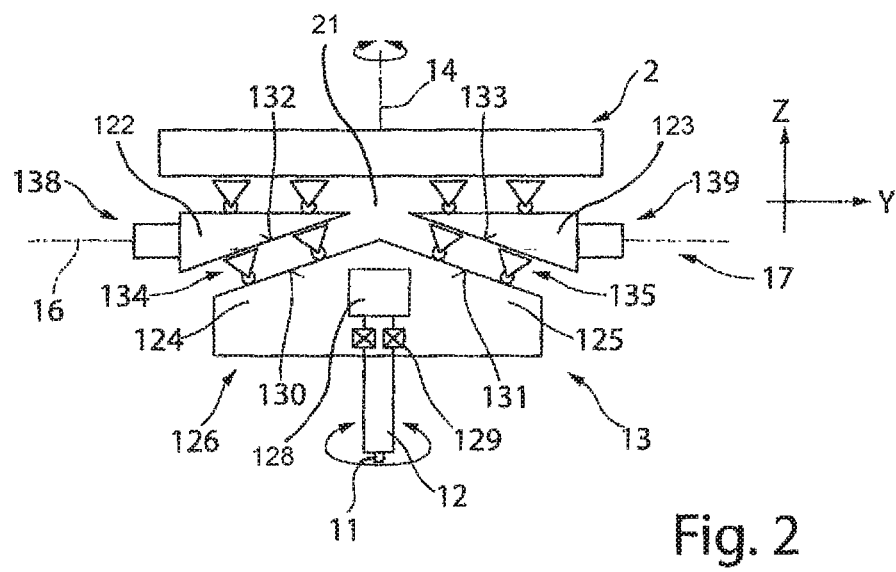
FIG. 2 schematically shows the principle structure of a stroke drive device and a motor drive according to FIG. 1.

One component of the stroke drive device 13 is the wedge gear 21, which is shown in FIG. 2. The wedge gear 21 comprises two drive-side wedge gear elements 122, 123, and two output-side wedge gear elements 124, 125. The latter are combined structurally to form a unit in the form of an output-side double wedge 126. The ram 12 is mounted on the output-side double wedge 126 so as to be rotatable about the stroke axis 14. A motor rotary drive device 128 is accommodated in the output-side double wedge 126 and advances the ram 12 about the stroke axis 14 as necessary. Here, both a left-handed and a right-handed rotation of the ram 12 in accordance with the double-headed arrow in FIG. 2 are possible. A ram mounting 129 is shown schematically. On the one hand, the ram mounting 129 allows low-friction rotary movements of the ram 12 about the stroke axis 14, and on the other hand the ram mounting 129 supports the ram 12 in the axial direction and accordingly dissipates loads that act on the ram 12 in the direction of the stroke axis 14 in the output-side double wedge 126.

The output-side double wedge 126 is defined by a wedge surface 130, and by a wedge surface 131 of the output-side gear element 125. Wedge surfaces 132, 133 of the drive-side wedge gear elements 122, 123 are arranged opposite the wedge surfaces 130, 131 of the output-side wedge gear elements 124, 125. By means of longitudinal guides 134, 135, the drive-side wedge gear element 122 and the output-side wedge gear element 124, and also the drive-side wedge gear element 123 and the output-side wedge gear element 125, are guided moveably relative to one another in the direction of the Y axis, that is to say in the direction of the positioning axis 16 of the stroke drive device 13.

The drive-side wedge gear element 122 has a motor drive unit 138, and the drive-side wedge gear element 123 has a motor drive unit 139. Both drive units 138, 139 together form the spindle drive assembly 17.

The drive spindle 18 shown in FIG. 1 is common to the motor drive units 138, 139.

The drive-side wedge gear elements 122, 123 are operated by the motor drive units 138, 139 in such a way that said wedge gear elements move, for example, towards one another along the positioning axis 16, whereby a relative movement is performed between the drive-side wedge gear elements 122, 123 on the one hand and the output-side wedge gear elements 124, 125 on the other hand. As a result of this relative movement, the output-side double wedge 126 and the ram 12 mounted thereon is moved downwardly along the stroke axis 14. The punch mounted on the ram 12 for example as the upper tool 11 performs a working stroke and in so doing machines a workpiece 10 mounted on the workpiece rest 28, 29 or the workpiece support 8. By means of an opposite movement of the drive wedge elements 122, 123, the ram 12 is in turn raised or moved upwardly along the stroke axis 14.

The above-described stroke drive device 13 according to FIG. 2 is preferably of the same design as the lower stroke drive device 27 and receives the lower tool 9.

Figure 3:
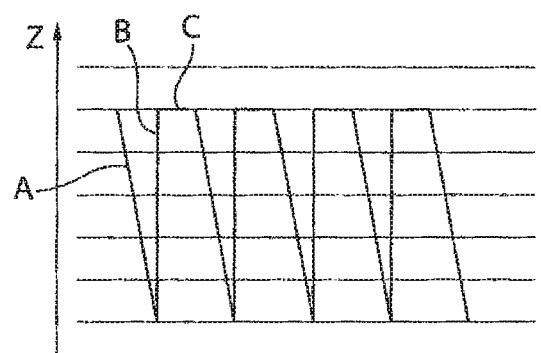
FIG. 3 is a schematic graph showing a superposed stroke movement, in the Y- and Z-direction, of the ram according to FIG. 1.

FIG. 3 shows a schematic graph of a possible stroke movement of the ram 12. The graph shows a stroke profile along the Y axis and the Z axis. By means of a superposed control of a traversing movement of the ram 12 along the stroke axis 14 and along the positioning axis 16, an obliquely running stroke movement of the stroke ram 12 downwardly towards the workpiece 10 can, for example, be controlled, as shown by the first straight line A. Once the stroke has been performed, the ram 12 can then be lifted vertically, for example, as illustrated by the straight line B. For example, an exclusive traversing movement along the Y axis is then performed in accordance with the straight line C, in order to position the ram 12 for a new working position relative to the workpiece 10. For example, the previously described working sequence can then be repeated. If the workpiece 10 is moved on the workpiece rest surface 28, 29 for a subsequent machining step, a traversing movement along the straight line C may also be omitted.

The possible stroke movement of the ram 12 on the upper tool 11 shown in the graph in FIG. 3 is preferably combined with a lower tool 9 that is held stationary. Here, the lower tool 9 is positioned within the machine frame 2 in such a way that, at the end of a working stroke of the upper tool 11, the upper and lower tools 11, 9 assume a defined position.

This exemplary, superposed stroke profile can be controlled for both the upper tool 11 and the lower tool 9. Depending on the machining of the workpiece 10 that is to be performed, a superposed stroke movement of the upper tool and/or lower tool 11, 9 can be controlled.

Figure 4:
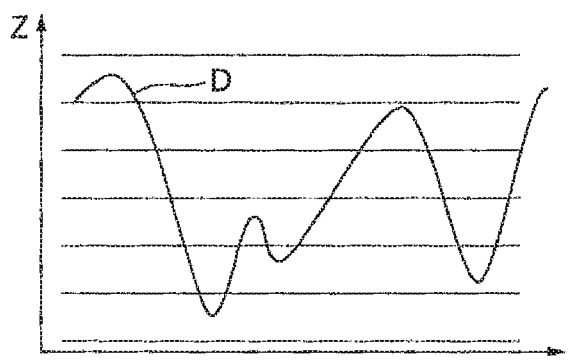
FIG. 4 is a schematic graph showing a further superposed stroke movement, in the Y- and Z-direction, of the ram according to FIG. 1.

FIG. 4 shows a schematic graph illustrating a stroke movement of the ram 12 in accordance with the line D, shown by way of example, along a Y axis and a Z axis. In contrast to FIG. 3, it is provided in this exemplary embodiment that a stroke movement of the ram 12 can pass through a curve profile or arc profile by controlling a superposition of the traversing movements in the Y direction and Z direction appropriately by the controller 15. By means of a versatile superposition of this kind of the traversing movements in the X direction and Z direction, specific machining tasks can be performed. The control of a curve profile of this kind can be provided for the upper tool 11 and/or the lower tool 9.

Figure 5:
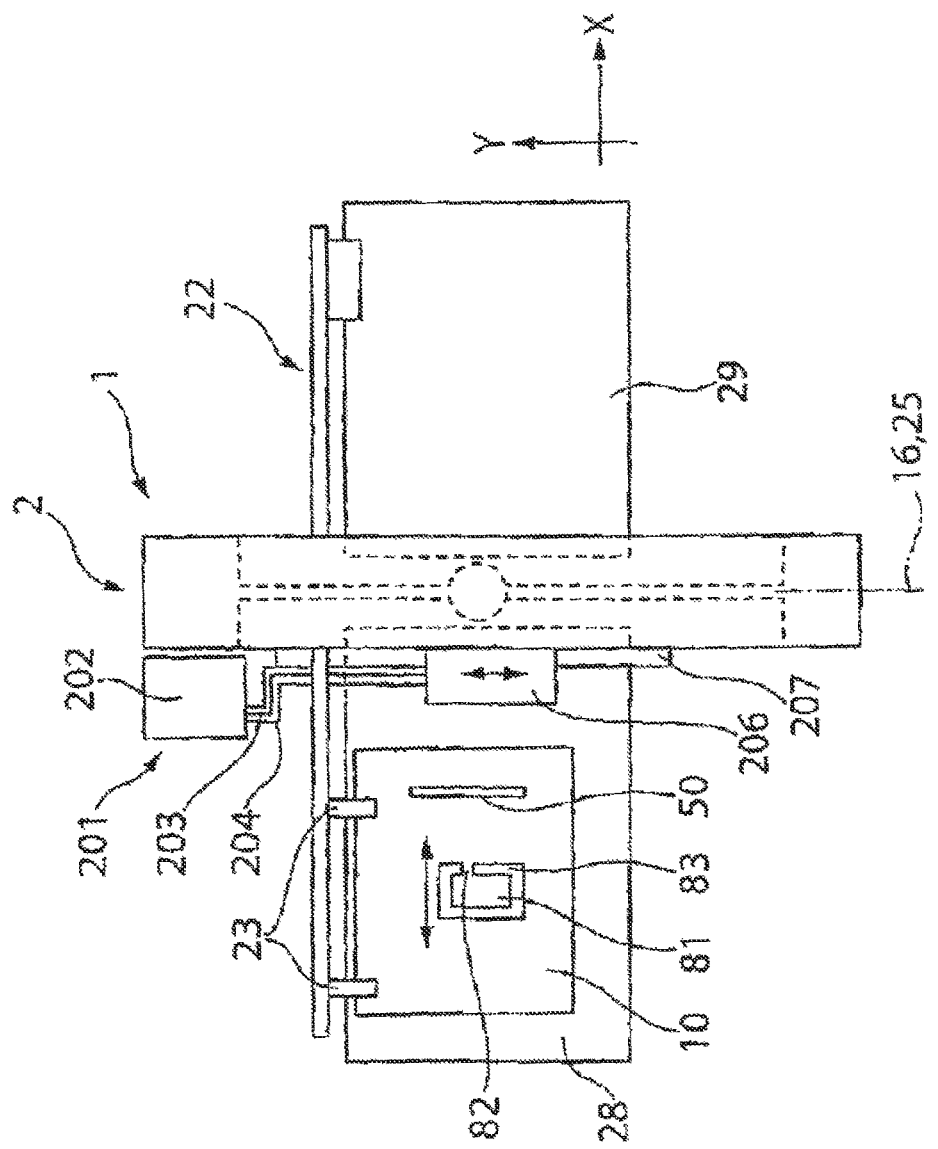
FIG. 5 is a schematic view from above of the machine tool according to FIG. 1 comprising workpiece rest surfaces.

FIG. 5 shows a schematic view of the machine tool 1 according to FIG. 1. Workpiece rests 28, 29 extend laterally in one direction each on the machine frame 2 of the machine tool 1. The workpiece rest 28 can, for example, be associated with a loading station (not shown in greater detail), by means of which unmachined workpieces 10 are placed on the workpiece rest 28. A feed device 22 is provided adjacently to the workpiece rest 28, 29 and comprises a plurality of grippers 23 in order to grip the workpiece 10 placed on the workpiece rest 28. The workpiece 10 is guided through the machine frame 2 in the X direction by means of the feed device 22. The feed device 22 may also preferably be controlled so as to be moveable in the Y direction. A free traversing movement of the workpiece 10 in the X-Y plane may thus be provided. Depending on the work task, the workpiece 10 may be moveable by the feed device 22 both in the X direction and against the X direction. This movement of the workpiece 10 can be adapted to a movement of the upper tool 11 and lower tool 9 in and against the Y direction for the machining work task at hand.

The further workpiece rest 29 is provided on the machine frame 2 opposite the workpiece rest 28. This further workpiece rest can be associated, for example, with an unloading station. Alternatively, the loading of the unmachined workpiece 10 and unloading of the machined workpiece 10 having workpieces 81 can also be associated with the same workpiece rest 28, 29.

The machine tool 1 may furthermore comprise a laser machining device 201, in particular a laser cutting machine, which is shown merely schematically in a plan view in FIG. 5. This laser machining device 201 may be configured, for example, as a CO2 laser cutting machine. The laser machining device 201 comprises a laser source 202, which generates a laser beam 203, which is guided by means of a beam guide 204 (shown schematically) to a laser machining head, in particular laser cutting head 206, and is focused therein. The laser beam 204 is then oriented perpendicularly to the surface of the workpiece 10 by a cutting nozzle in order to machine the workpiece 10. The laser beam 203 acts on the workpiece 10 at the machining location, in particular cutting location, preferably jointly with a process gas beam. The cutting point, at which the laser beam 203 impinges on the workpiece 10, is adjacent to the machining point of the upper tool 11 and lower tool 9.

The laser cutting head 206 is moveable by a linear drive 207 having a linear axis system at least in the Y direction, preferably in the Y and Z direction. This linear axis system, which receives the laser cutting head 206, can be associated with the machine frame 2, fixed thereto or integrated therein. A beam passage opening can be provided in the workpiece rest 28 below a working space of the laser cutting head 206. A beam capture device for the laser beam 203 may be provided preferably beneath the beam passage opening. The beam passage opening and as applicable the beam capture device can also be configured as one unit.

The laser machining device 201 may alternatively also comprise a solid-state laser as laser source 202, the radiation of which is guided to the laser cutting head 206 with the aid of a fiber-optic cable.

The workpiece rest 28, 29 may extend directly as far as the workpiece support 8 which surrounds the lower tool 9 at least in part. Within a resultant free space created therebetween, the lower tool 9 is moveable along the lower positioning axis 25 in and against the Y direction.

For example, a machined workpiece 10 lies on the workpiece rest 28, in which workpiece a workpiece part 81 is cut free, apart from a remaining connection 82, by a cutting gap 83, for example by means of a punching operation or by laser beam machining. The workpiece 81 is held in the workpiece 10 or the remaining residual lattice by means of this remaining connection. In order to separate the workpiece part 81 from the workpiece 10, the workpiece 10 is positioned by means of the feed device 22 relative to the upper and lower tool 11, 9 for a cutting and discharge step. In this case, the remaining connection 82 is separated by a punching stroke of the upper tool 11 relative to the lower tool 9. The workpiece part 81 can, for example, be discharged downwardly by partially lowering of the workpiece support 8. Alternatively, in the case of larger workpiece parts 81, the cut-free workpiece part 81 can be transferred back again to the workpiece rest 28 or to the workpiece rest 29 in order to unload the workpiece part 81 and the residual lattice. Small workpiece parts 81 may also optionally be discharged through an opening in the lower tool 9.

Figure 6:
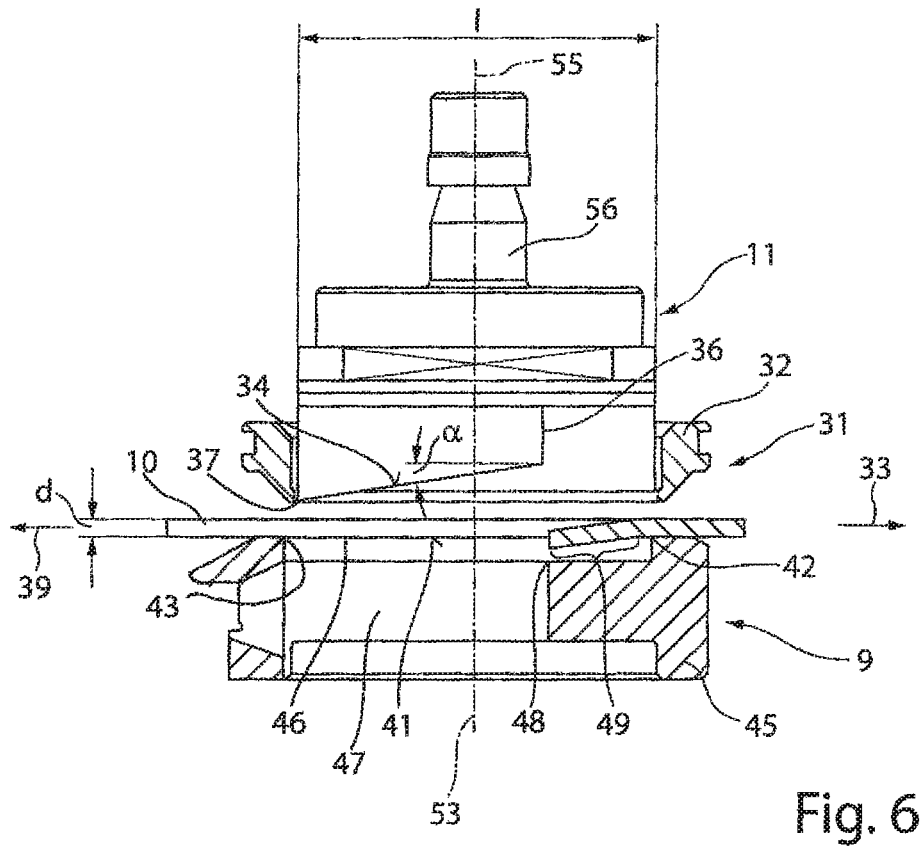
FIG. 6 is a schematic side view of a slotting tool.

FIG. 6 is a schematic cross section of a slotting tool 31 which consists of the upper tool 11 and the lower tool 9. In the following, the upper tool 11 will be referred to as the punch and the lower tool 9 as the die. An associated scraper 32, for example, is shown on the punch 11. The punch 11 comprises two longitudinal cutting edges 34 which run in the slot direction 33 and rise up, in the slot direction 33, with respect to the workpiece 10, in particular metal sheet, to be slotted. A transverse cutting edge 36 that is at the front in the slot direction 33, and a rear transverse cutting edge 37, extend transversely to said slot direction, between the longitudinal cutting edges 34 of the punch 11. The feed direction 39 is shown counter to the slot direction 33.

The die 9 is likewise provided with longitudinal cutting edges 41 that run in the slot direction 33. A front transverse cutting edge 42 and a rear transverse cutting edge 43 extend transversely to the slot direction 33, between said longitudinal cutting edges. A main body 45 of the die 9 comprises an opening 46 into which the longitudinal cutting edges 34 can enter and which leads into an aperture 47 which completely penetrates the main body 45.

The die 9 furthermore comprises a trimming edge 48 which is set back, with respect to the front transverse cutting edge 42, in the direction of the rear transverse cutting edge 43. Said trimming edge 48 is recessed relative to the front transverse cutting edge 42. Said trimming edge 48 is advantageously of the same length as the transverse cutting edge 42. The trimming edge 48 and, opposite thereto, the rear transverse cutting edge 43, define the length of the aperture 47 and thus the length of the material strip 58 that is to be discharged. The distancing of the front transverse cutting edge 36 and the rear transverse cutting edge 37 of the punch 11 can be adjusted to the length of the aperture 47. The aperture 47 is preferably greater than the distancing of the front transverse cutting edge 36 and the rear transverse cutting edge 37 of the slotting tool 31. The clearance resulting therefrom can be used to adjust the cutting gap width in the Y-direction, on the basis of the workpiece thickness d of the workpiece 10. The opening 46 is longer than the aperture 47. As a result, the material strip 58 that is cut free is not completely separated, but instead the section 49 remains on the workpiece 10. The quality of the slot 50 (FIG. 5) can thus be increased.

In FIG. 4, the abbreviation "d" is provided for the thickness of the workpiece 10, and the abbreviation "α" for the angle of inclination of the longitudinal cutting edge 34 on the punch 11 relative to the workpiece 10.

Figure 7:
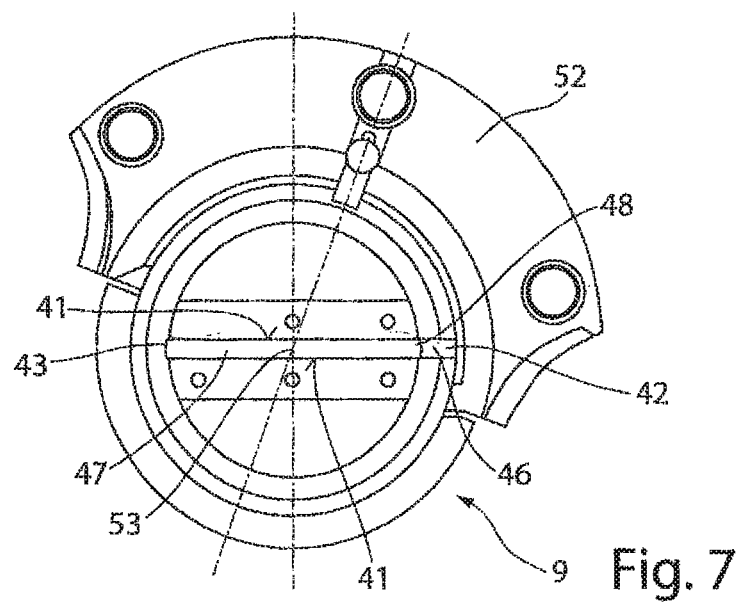
FIG. 7 is a schematic view from above of a die of the slotting tool according to FIG. 6, FIGS. 8A to 8E schematically illustrate the progression of a sectioning phase during operation of the machine tool according to FIG. 1, FIGS. 9A to 9E schematically illustrate the progression of a working phase during operation of the machine tool according to FIG. 1, FIGS. 10A and 10B schematically illustrate the progression of an end phase during operation of the machine tool according to FIG. 1.

FIG. 7 shows a schematic view of the die 9 according to FIG. 6. The longitudinal cutting edge 41 and the front and rear transverse cutting edge 42, 43 adjoin a rest surface 52 on the die 9.

The machine tool 1 in FIG. 5 shows the workpiece 10 after the slot 50 has been produced. The above procedures for producing a slot 50 of this kind in the workpiece 10 can be seen in the following FIGS. 8 to 10.

Before the individual method steps for producing the slot 50 are started, the die 9 is rotated about the positioning axis 53 thereof, in order to orientate the opening 46, such that said opening is oriented towards the punch 11. Alternatively and/or in addition, the punch 11 can be rotated about the positioning axis 55 thereof. Said positioning axis 55 of the punch 11 is preferably located in the longitudinal axis, in particular in the longitudinal axis of a clamping shaft 56 for receiving the punch 11 on the stroke drive device 13 of the machine tool 1. The positioning axis 53 of the die 9 preferably corresponds to a center line of the die 9 or of the main body 45 that is preferably interchangeably received on a lower stroke drive device 27 or on a lower positioning axis 25.

Figure 8A:
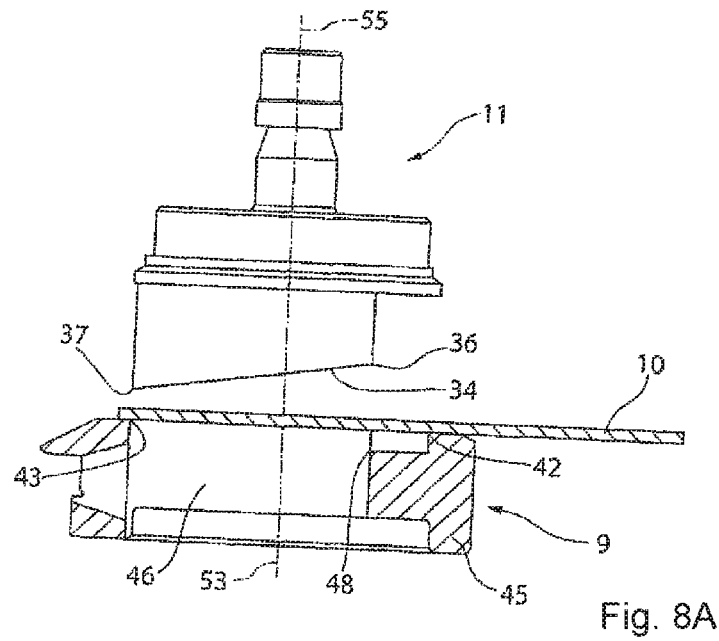
Figure 8B:
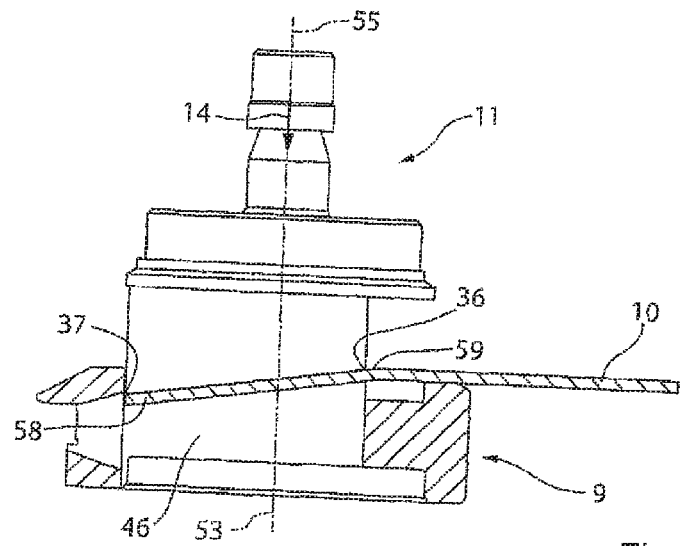
Figure 8C:
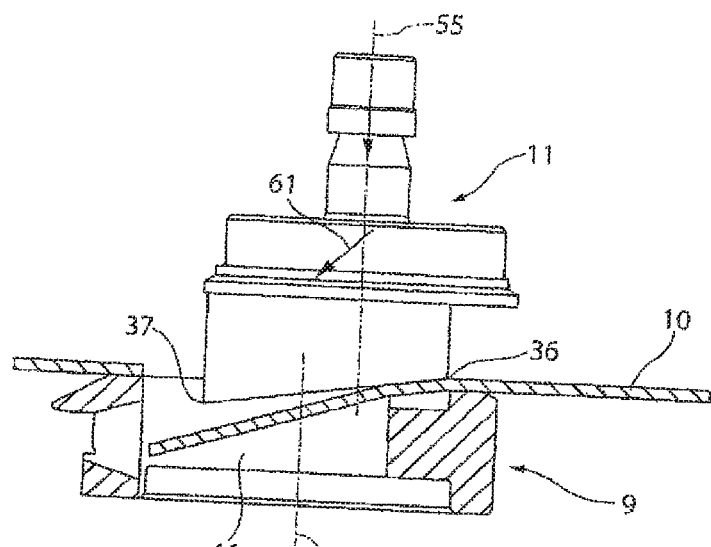

After the slotting tool 31 has been exchanged and oriented, a sectioning phase is started, which is shown in individual process steps in FIGS. 8A to 8E. The workpiece 10 is positioned relative to the slotting tool 31 by means of the feed device 22, and in the process is pushed into the intermediate space between the punch 11 and the die 9, wherein an edge of the workpiece 10 protrudes relative to the opening 46 and at least rests on, or protrudes relative to, the rest surface 52 of the die 9. In this case, the punch 11 is in its initial position relative to the die 9, in the stroke direction 14. Subsequently, a section is created in the workpiece 10 by means of a sectioning slot stroke, as is shown in FIG. 8B. Alternatively, the sectioning slot stroke may also be provided on the workpiece edge. A section of this kind is also referred to as a splice. In this case, rear transverse definition of the slot 50 in the slot direction 33, and the first part of the longitudinal definition of said slot running in the slot direction 33 is created by means of the interaction of the rear transverse cutting edge 37 on the punch 11 and the rear transverse cutting edge 43 of the die 9. In the process, a material strip 58 is cut free. Owing to corresponding control of the stroke drive device 13, in the case of the sectioning slot stroke, the punch 11 enters the die 9 only so far that a connection between the material strip 58 and the remaining workpiece 10 is retained on the side located in the slot direction 33. In the sectioning slot stroke, the punch 11 is raised, in the initial position thereof, and displaced in the slot direction 33 by means of the upper positioning axis 16. It is alternatively possible for the punch 11 to be raised and the die 9 to be displaced relative to the punch 11. A relative movement of the punch 11 and of the die 9 may also be provided. Said traversing movement is controlled such that the bending edge 59 created in the sectioning slot stroke is directly adjacent to the front transverse cutting edge 42 of the die 9 or the front transverse cutting edge 36 of the punch 11. Subsequently, in a first stroke phase, a stroke movement of the punch 11 onto the die 9 takes place, which movement is controlled such that the longitudinal cutting edges 34 of the punch 11 come to rest on the material strip 58, as is shown in FIG. 8C. In this case, a trimming stroke between the front transverse cutting edge 36 of the punch 11 and the front transverse cutting edge 42 of the die 9 is prevented.

Figure 8D:
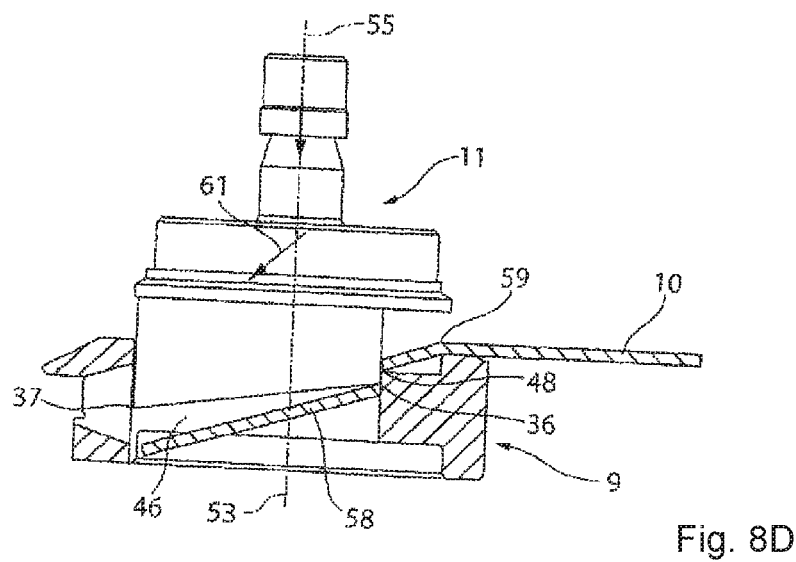

Subsequently, in a second stroke phase, the stroke movement of the punch 11 along the stroke axis 14 is superposed by a traversing movement in a further movement axis that is different from the stroke axis. The further traversing movement is preferably in a movement axis perpendicular to the stroke axis 14, in particular in the direction of the upper or lower positioning axis 16, 25. The stroke axis is preferably oriented in the Z-direction, and the superposed traversing movement as a lateral movement, in or counter to the Y-direction. This results in a traversing movement of the punch 11 which corresponds to the arrow 61 shown in FIG. 8C for example. The superposed stroke and lateral movement of the punch 11 is continued, in the second stroke phase, until the material strip 58, also referred to as the chip, is separated. In this case, the rear transverse cutting edge 37 of the punch 11 may be positioned directly adjacently to or come to rest on the rear transverse cutting edge 43 of the die 9. Provided that the slotting tool 31 is shorter than the length of the aperture 47 in the die 9, a collision between the rear transverse cutting edge 37 of the punch 11 and the rear transverse cutting edge 43 of the die 9 can be prevented. Subsequently, a third stroke phase is initiated, which is shown in FIG. 8D. The traversing movement of the punch 11 along the opening 46 of the die 9 is stopped. In the third stroke phase, the stroke movement of the punch 11 is further controlled, such that the front transverse cutting edge 36 of the punch 11 performs a trimming stroke and the material strip 58 is separated at the inner trimming edge 48.

Figure 8E:
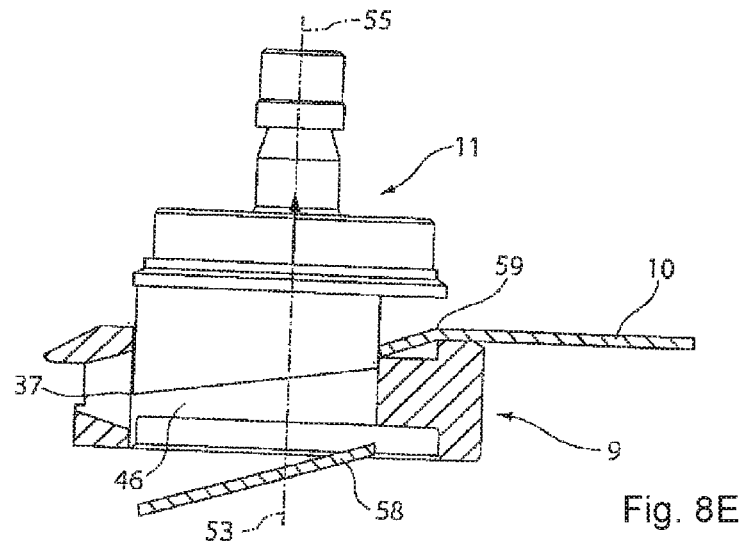

Subsequently, the separated material strip 58 is discharged downwards, through the aperture 47, as is shown in FIG. 8E. Subsequently, the punch 9 returns into an initial position, according to FIG. 8A, by means of the stroke drive device 13. The section is ended.

The sectioning phase is followed by the working phase shown in FIGS. 9A to 9E. In order to position the slotting tool 31 relative to the workpiece 10, the slotting tool 31 is displaced such that a front free end of the material strip 58 is located within the opening 46 of the die 9, or adjoins the rear transverse cutting edge 43 of the die 9. If the workpiece 10 is moveable in the feed direction 39, by means of the feed device 22, a relative movement between the slotting tool 31 and the workpiece 10 may alternatively be provided for the purpose of positioning. Thereafter, the punch 11 is moved relative to the die 9 by means of a traversing movement, such that the front transverse cutting edge 36 of the punch 11 is again located above the front transverse cutting edge 42 of the die 9. This is clear from the offset of the positioning axes 55, 53. During this traversing movement, the punch 11 may also be stopped and the die 9 moved, in order to assume the starting position according to FIG. 9B, for a subsequent stroke movement.

The subsequent performance of the slotting stroke according to FIGS. 9A to 9E corresponds to the slotting stroke according to FIG. 8C to 8E, and therefore, in order to avoid repetitions, reference is hereby made thereto in its entirety. The sectioning phase is analogous to the working phase, in the sequence of the three stroke phases during a working stroke, after the first section has been made according to FIG. 8B.

The working phase according to FIGS. 9A to 9E is repeated until a transverse definition of the slot 50 that is located towards the front in the slot direction 33 is almost achieved. An end phase is the initiated, which is shown in FIGS. 10A and 10B.

Figure 9A:
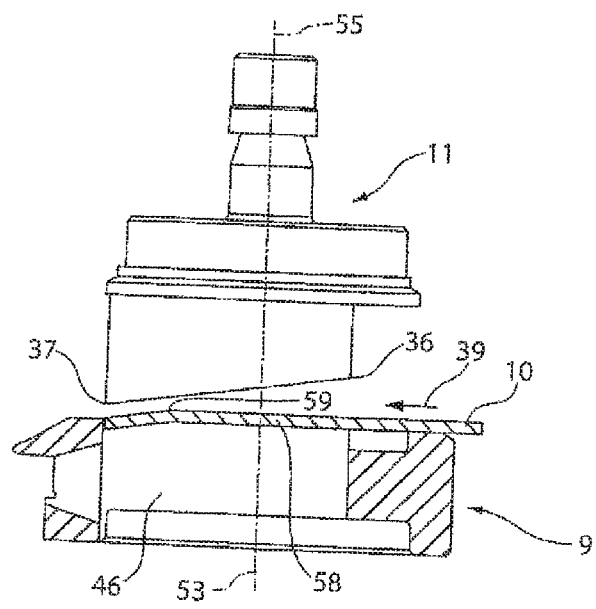
Figure 9B:
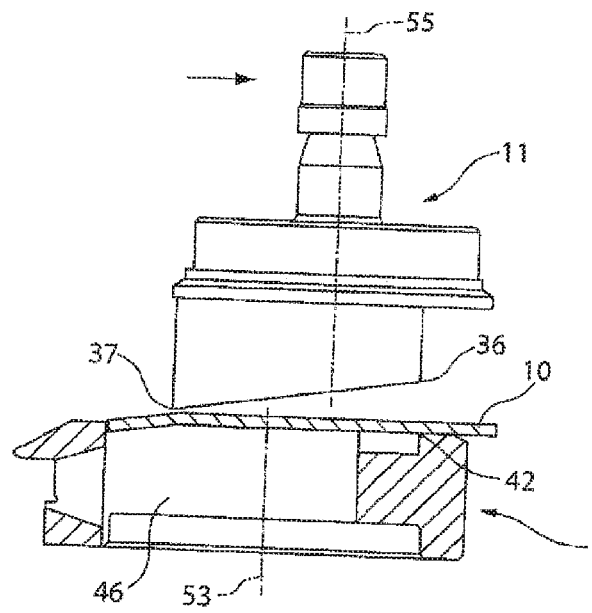
Figure 9C:
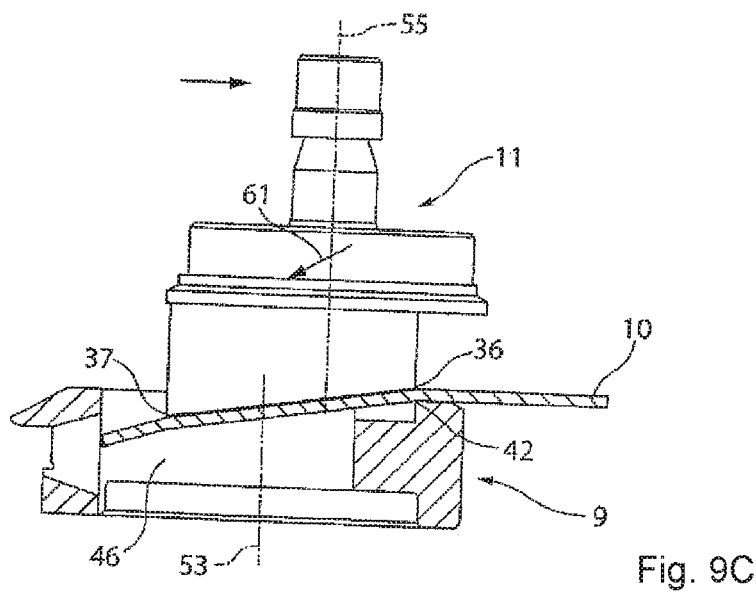
Figure 9D:
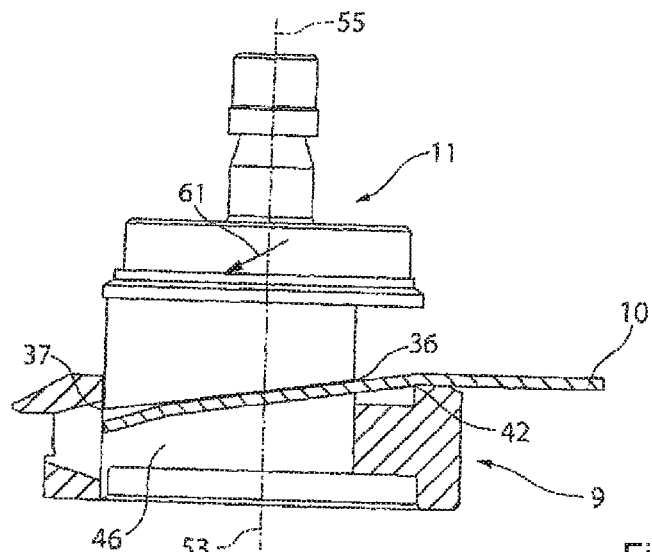
Figure 9E:
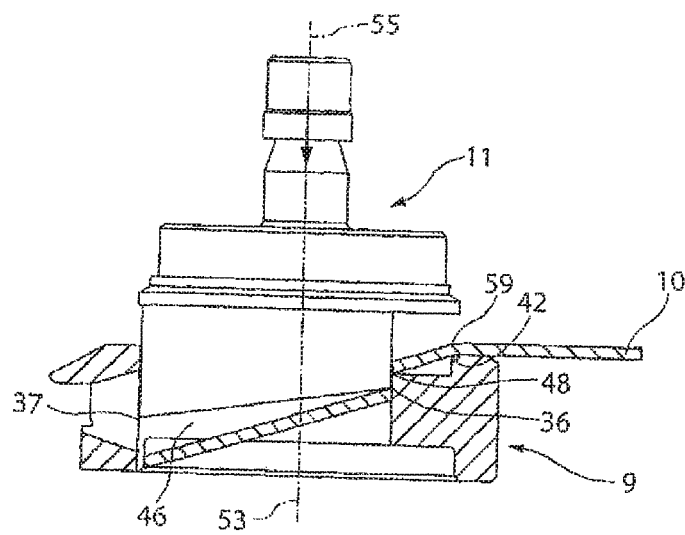
Figure 10A:
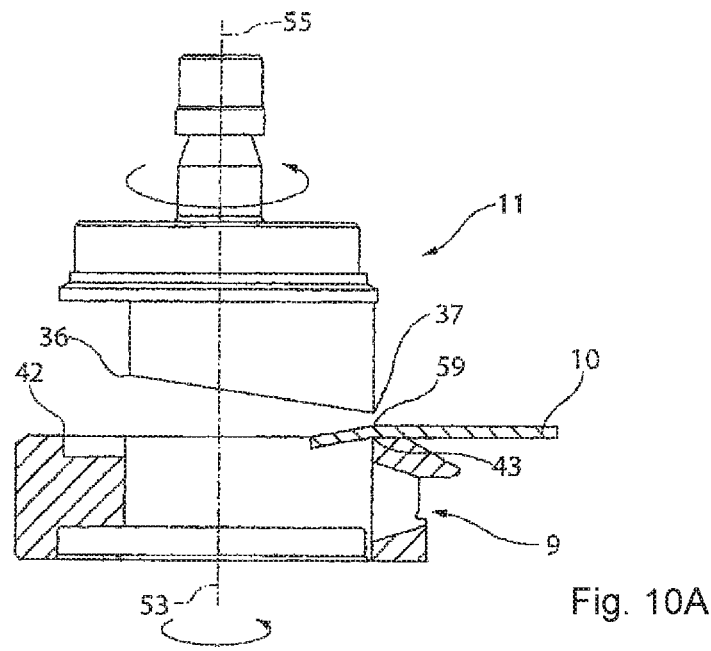
Figure 10B:
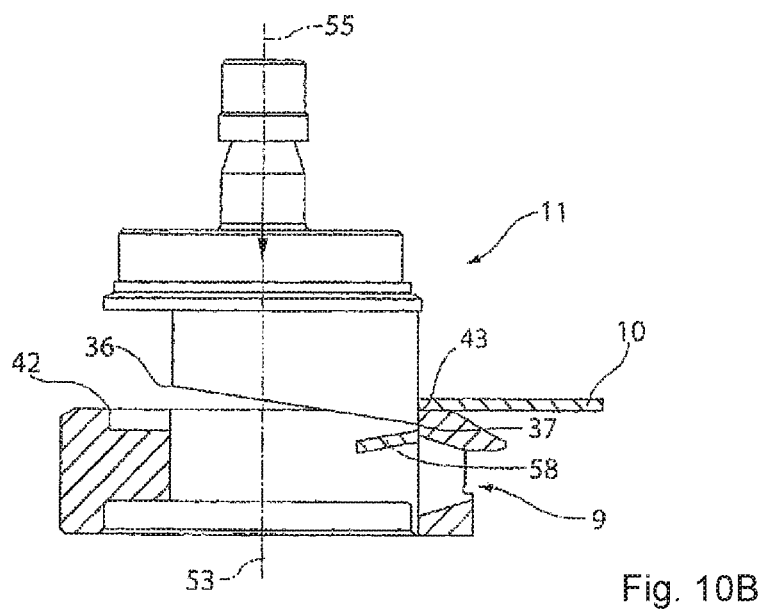

The end phase is initiated proceeding from the positioning of the die 9 relative to the workpiece 10 according to FIG. 9E, and a punch 11 that is thereupon raised into a starting position for a new stroke movement. A rotary movement of the punch 11 about the positioning axis 55 and/or a rotary movement of the die 9 about the positioning axis 53 thereof is controlled. Said at least one rotary movement covers an angle of 180°. During control of a rotary movement of the die 9, it is preferable for said rotary movement to be controlled having a stroke movement in the form of a lowering movement along the lower stroke axis 30, in order to prevent catching on a shear lug, which is inclined downwards, relative to the workpiece plane, on the bending edge 59, during the rotary movement. Subsequently, the rear transverse cutting edge 37 of the punch 11 is moved towards the rear transverse cutting edge 43 of the die 9 by means of a relative movement. Said end stroke is performed as a trimming stroke, as is shown in FIG. 10B. In said trimming stroke, the last part of the slot 50, including the front transverse definition of the slot 50, is created. In said final trimming stroke, a bending edge between a part of the material strip 58, in particular the shear lug, and the solid material, is separated. Following a subsequent return stroke of the punch 11 into an initial position, the workpiece 10 can be moved further, by means of the feed device 22, in order to transfer said workpiece into a position according to FIG. 5 or into a further position between the slotting tool 31, in order to make at least one further slot.

In the present method according to the invention, a working stroke is controlled both during the sectioning phase and during the working phase, in which working stroke at least three stroke phases are provided, wherein a return stroke-free control of the stroke movement is preferably controlled during the at least three stroke phases. Preferably, a continuous stroke movement along the stroke axis 14, in particular Z-axis, is controlled, wherein superposition of the stroke movement along the stroke axis 14 by means of a deviating traversing movement occurs between the first and third stroke phase. In particular a lateral movement is provided, which movement takes place for example in the direction of the Y-axis or a positioning axis 16, 25 of the machine tool 1.

This makes it possible to perform both a slotting stroke for cutting free a material strip 58, and the subsequent separation of the cut-free material strip 58, without an additional traversing movement of the workpiece 1 relative to the slotting tool 31.

Figure 11:
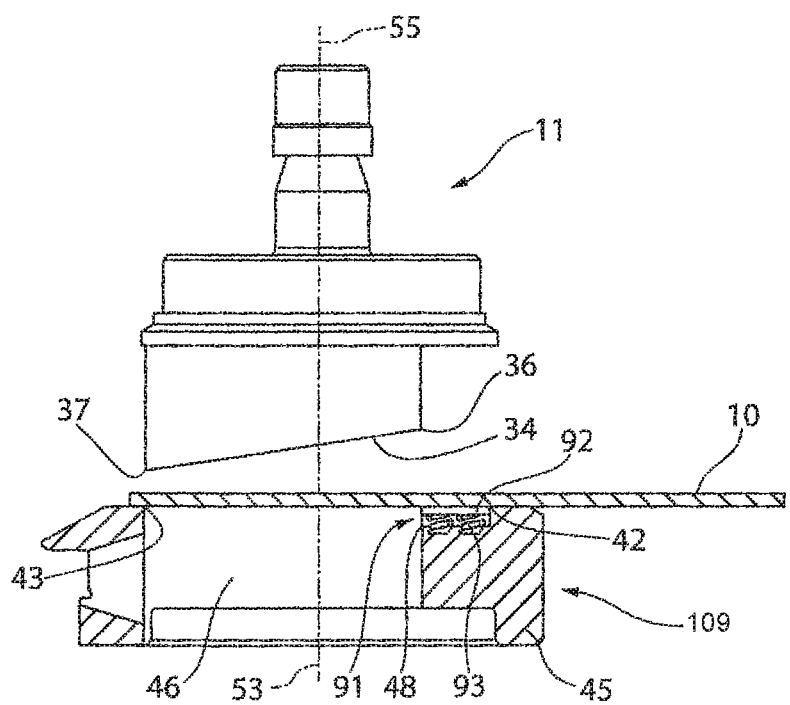
FIG. 11 is a schematic side view of an alternative die compared with FIG. 6.

FIG. 11 shows an alternative embodiment of a tool consisting of the punch 11 and the die 109. The punch 11 corresponds to the embodiment shown in FIG. 6. The die 109 deviates from the embodiment according to FIG. 6 in that an ejector element 91 is additionally provided. Said ejector element 91 is provided between the front transverse cutting edge 42 and the trimming edge 48. The ejector element 91 comprises an ejector plate 92 which preferably adjoins the front transverse cutting edge 42 of the die 109. Opposite thereto, the ejector plate 92 is preferably flush with the trimming edge 48. In order to position the ejector plate 92 in a rest surface 52 of the die 9, at least one restoring element 93 is preferably provided, which element is resiliently yielding in the direction of the main body 45 of the die 109. For example, compression springs or rubbery-elastic dampers may be provided.

For a subsequent end phase of the machining of the slot 50, proceeding from FIG. 9E, said ejector element 91 causes the shear lug that is inclined in the direction of the opening to be raised to a workpiece plane or to the plane of the rest surface 52, such that a catch-free rotary movement of the die about 180° can subsequently take place, as shown in FIG. 10A. When an ejector element 91 is arranged in the lower die, said ejector element can be kept at the same level during a rotation of the die about 180°.

What is claimed is:

1. A method of multiple-stroke slotting of planar workpieces by a slotting tool, the method comprising:
positioning a workpiece relative to the slotting tool, the workpiece being a planar workpiece, wherein the slotting tool comprises a punch and a die between which the workpiece is positioned for machining,
wherein the punch comprises:
two punch longitudinal cutting edges running in a slot direction and
front and rear punch transverse cutting edges running transversely to the slot direction at longitudinal ends of the punch longitudinal cutting edges and between the punch longitudinal cutting edges,
wherein the punch longitudinal cutting edges of the punch rise up on the punch, relative to the workpiece, in the slot direction, and the front punch transverse cutting edge of the punch is higher than the rear punch transverse cutting edge of the punch, and
wherein the die comprises:
two die longitudinal cutting edges running in the slot direction and
front and rear die transverse cutting edges running transversely to the slot direction at longitudinal ends of the die longitudinal cutting edges and between the die longitudinal cutting edges;
moving the punch and the die relative to one another to achieve a relative movement of the punch and the die;
moving the slotting tool and the workpiece relative to one another in a feed direction;
in a sectioning phase, slotting the workpiece by a slot length during a sectioning slot stroke and at least one subsequent slotting stroke, the sectioning phase comprising:
creating a section on a workpiece edge or at a distance from the workpiece edge during the sectioning slot stroke, and
performing the at least one subsequent slotting stroke after the sectioning slot stroke; and
in a working phase, performing working strokes during the relative movement of the punch and the die, the working strokes comprising working slotting strokes and at least one trimming stroke, the working phase comprising:
during the working slotting strokes, cutting a material strip to be partially free by the punch and the die, the material strip having a connection to a remaining portion of the workpiece located in the slot direction, and
during the at least one trimming stroke, trimming the connection to separate the material strip from the remaining portion of the workpiece by the punch and the die,
wherein, in the working phase, at least one of the punch and the die is controlled in a superposed manner by a working stroke movement along a stroke axis and a further traversing movement along a movement axis, the further traversing movement being different from the working stroke movement,
wherein the at least one subsequent slotting stroke is performed prior to the at least one trimming stroke, and the slot length during the sectioning slot stroke and the at least one subsequent slotting stroke exceeds an attainable slot length during the at least one trimming stroke, and
wherein the workpiece and the slotting tool are moved relative to one another in the feed direction, by at least one feed movement, between the working strokes during the relative movement of the punch and the die.

2. The method of claim 1, wherein a position of the workpiece relative to at least one of the punch and the die is maintained during the working phase.

3. The method of claim 1, wherein the working strokes comprise a return working stroke, and the slotting tool is controlled in the return working stroke, and wherein, during the return working stroke, the material strip is cut in one of the working slotting strokes and is separated from the remaining portion of the workpiece in the at least one trimming stroke subsequent to the one of the working slotting strokes.

4. The method of claim 1, wherein a working stroke of the working strokes within the working phase is divided into a plurality of stroke phases, and the working stroke is controlled in a first stroke phase of the plurality of stroke phases by a single-axis stroke movement in which the punch and the die are moved towards one another, the working stroke being one of the working slotting strokes for cutting the material strip, and wherein at least one second stroke phase of the plurality of stroke phases is initiated after the material strip has been cut, wherein the further traversing movement is superposed on the working stroke movement in the at least one second stroke phase, and wherein a position axis of the punch and a position axis of the die are changed relative to one another by the further traversing movement.

5. The method of claim 4, wherein the first stroke phase of the working stroke is ended when the front punch transverse cutting edge of the punch is transferred to a height of the front die transverse cutting edge of the die or is positioned relative to the die to be at a distance from a material thickness of the workpiece.

6. The method of claim 4, wherein at least one of a traversing movement of the punch and a traversing movement of the die in the second stroke phase of the working stroke is ended when the front punch transverse cutting edge of the punch is located opposite an inner trimming edge in the die that is located deeper than the front die transverse cutting edge of the die, and wherein the at least one of the traversing movement of the punch and the traversing movement of the die comprises the further traversing movement.

7. The method of claim 4, wherein a third stroke phase following the second stroke phase of the working stroke is controlled by at least one of a punch stroke movement of the punch and a die stroke movement of the die, such that the material strip is separated from the remaining portion of the workpiece at an inner trimming edge in the die, and wherein the at least one of the punch stroke movement of the punch and the die stroke movement of the die comprises the working stroke movement along the stroke axis.

8. The method of claim 4, wherein the sectioning phase comprises a first working stroke, during which the material strip is cut, wherein the single-axis stroke movement of the punch relative to the die is restricted, such that only part of the punch longitudinal cutting edges of the punch enters an opening of the die, and wherein the first working stroke is different from the working strokes in the working phase.

9. The method of claim 8, wherein the plurality of stroke phases of the working stroke in the working phase follow the first working stroke of the sectioning phase.

10. The method of claim 1, further comprising:
performing an end phase after the working phase has been performed, the end phase comprising:
rotating the slotting tool by 180° about a position axis, while maintaining a position of the workpiece, and
subsequently performing an end stroke, during which a part of the material strip is cut free from a solid material of the workpiece.

* * * * *